United States Patent [19]

Elfline

[11] Patent Number: 4,902,665

[45] Date of Patent: Feb. 20, 1990

[54] REMOVAL OF HEAVY METALS AND HEAVY METAL RADIOACTIVE ISOTOPES FROM LIQUIDS

[75] Inventor: Geraldine S. Elfline, Morrison, Ill.

[73] Assignee: Iso-Clear Systems Corporation, Oak Ridge, Tenn.

[21] Appl. No.: 225,936

[22] Filed: Jul. 29, 1988

Related U.S. Application Data

[60] Division of Ser. No. 892,960, Aug. 4, 1986, Pat. No. 4,800,024, which is a continuation-in-part of Ser. No. 849,152, Apr. 7, 1986, Pat. No. 4,764,281.

[51] Int. Cl.[4] .................... B01J 20/26

[52] U.S. Cl. .................... 502/402; 502/404

[58] Field of Search .................... 502/404, 402

[56] References Cited

U.S. PATENT DOCUMENTS

| | | | |
|---|---|---|---|
| 3,951,859 | 4/1976 | Inaba et al. | 502/404 X |
| 3,953,360 | 4/1976 | Morishita et al. | 502/404 X |
| 4,118,336 | 10/1978 | Morishita et al. | 502/404 X |

*Primary Examiner*—Patrick P. Garvin

*Attorney, Agent, or Firm*—Mason, Kolehmainen, Rathburn & Wyss

[57] ABSTRACT

A method of treating a heavy metal and/or a radioactive metal-containing natural water or liquid such as a radioactive metal-containing wastewater stream, a potable water supply containing naturally-occurring radioactive elements, an oil containing one or more radioactive metals, or other nuclear metal-bearing liquid by contacting the radioactive heavy metal-containing liquid with a water-insoluble carboxylated cellulose-transition metal oxide mixture to separate the heavy metals from the liquid. The heavy metal and radioactive heavy metals precipitate from the liquid onto the cellulose material to form a radioactive metal-laden solid material. The radioactive metal-laden solid then is air-dried, calcined and/or admixed with a leach-resistant matrix, such as grout or asphalt, for suitable disposal. The process has been found to be unexpectedly effective on heavy metal contaminated waters and particularly on radioactive natural waters, radioactive wastewaters or any other liquid containing one or more radioactive heavy metal ions such as U, Ce, Sr, Ru, Ra, Np and Tc.

25 Claims, No Drawings

REMOVAL OF HEAVY METALS AND HEAVY METAL RADIOACTIVE ISOTOPES FROM LIQUIDS

CROSS REFERENCE TO RELATED APPLICATION

This is a division of application Ser. No. 892,960, filed Aug. 4, 1986 and now U.S. Pat. No. 4,800,024, which in turn is a continuation-in-part of application Ser. No. 849,152, filed April 7, 1986 and now U.S. Pat. No. 4,764,281.

FIELD OF THE INVENTION

The present invention is directed to a method for removing dissolved heavy metals and/or dissolved radioactive heavy metals and other radioactive ions from natural waters, wastewaters, oils or other liquids. This invention is especially useful in removing low levels of radiation, such as less than $1\times10^{10}$ Becquerels per liter, or disintegrations per second per liter. More particularly, the present invention is directed to a method for treating heavy metal and radioactive heavy metal-containing liquids, such as liquids containing the radioactive nuclear-isotopes of radium, uranium, cesium, strontium, ruthenium, neptunium, technetium and/or other elements, with a mixture of a carboxylated cellulose and a heavy metal interactant—that is, a solid material that interacts with a heavy metal or on radioactive heavy metal ions to secure the heavy metal ions to the solid material, such as by chemical reaction, adsorption, absorption or ion exchange, such as radioactive metal-absorbing transition metal oxide.

In accordance with an important embodiment of the present invention, a liquid, water-soluble carboxylated cellulose is mixed with solid particles of a heavy metal interactant, such as an adsorbent or absorbent, such as $MnO_2$, in a liquid carrier, such as water, and the carboxylated cellulose is insolubilized, but made water-penetrable to trap the adsorbent or absorbent within the insolubilized, water-penetrable carboxylated cellulose. This embodiment is particularly advantageous to entrap the heavy metal interactant, e.g., absorbent, adsorbent, reactant or heavy metal ion-exchange material, within water-penetrable spherical beads by dropping the soluble carboxylated cellulose into an aqueous reactant solution, dropwise, to form water-penetrable spherical beads of the insoluble form of the carboxylated cellulose while entrapping the solid heavy metal interactant material in finely divided form, e.g., 0.1 to 100 and particularly 0.1 to 50 mixrons average particle size. Particularly advantageous is a mixture of an insoluble metal carboxymethylcellulose, such as aluminum carboxymethylcellulose, and a manganese dioxide interactant to remove radioactive heavy metals from the radioactive heavy metal-containing liquid. the radioactive heavy metal ions and other heavy metal ions interact with the insoluble carboxymethylcellulose and penetrate to contact the manganese dioxide for unexpected removal while entrapping the heavy metals along with the solid carboxymethylcellulose and manganese dioxide. The radioactive metal-laden carboxymethylcellulose-manganese dioxide mixture may then be air-dried, calcined or otherwise suitably heated to form a leach-resistant matrix for appropriate disposal.

BACKGROUND OF THE INVENTION

Federal, state and local governmental bodies reacting to constituent pressures have instituted a series of laws and regulations aimed at protecting the public health and preventing the continued contamination of the environment. Heavy metals are generally defined as hazardous and, therefore, must be removed from natural waters and industrial effluent streams. Once removed from these streams, the heavy metals-containing waste has been containerized and then disposed of in government-sanctioned landfills. These special landfills are now being more closely monitored thereby forcing alternative methods of disposal of these solid heavy metal wastes. It is toward both the clean-up of these natural waters and effluent streams and the discontinued pollution of soil and ground waters that the invention of this method is aimed.

Progressively stricter regulatory criteria have forced industry to drastically reduce the residual metal content in wastewater discharges. Likewise, public water treatment agencies are being forced to maintain or improve the quality of public water supplies by removing trace amounts of man-made and naturally-occurring contaminants. Obviously, regulations pertaining to radioactive isotope-containing waters are among the most stringent and among the costliest with which to comply. Increased cost for the disposal of solid metal wastes also have forced industries and governmental agencies to examine present treatment techniques and to demand more efficient and cost effective alternatives to those currently available.

The ability of conventional water treatment methods to achieve the low levels of residual metals required by the higher standards for water purity in many cases is marginal. Recent legislation has made the disposal of sludge material extremely difficult and expensive, with no near term solution to the sludge disposal problem being apparent.

Because of these problems, industry and public health agencies in general, and the nuclear reaction segments in particular, have been forced to consider alternative methods for heavy metals removal from natural and wastewater streams. The major objectives of heavy metals removal methods from various waters are: ability to reduce residual metals contents to extremely low levels (ultimately to the parts-per-billion range or, in the case of radioactive isotopes, to pico-curies or parts-per-trillion range); production of a water supply suitable for public consumption; production of minimal amounts of sludge; economical operation; production of an effluent suitable for disposal or recycle to process operations; and ability for maximum retrofit into existing operations.

Some of these problems were addressed in an analysis of the processes used in treating drinking water for the removal of radioactive contaminants, and of the disposal of wastes generated by these processes in TREATMENT, WASTE MANAGEMENT AND COST FOR REMOVAL OF RADIOACTIVITY FROM DRINKING WATER, G. W. Reid, P. Lassovsky, and S. Hathaway, Health Physics, 48 (1985) pp. 671–694. The alternative processes, including ion exchange, reverse osmosis or electrodialysis, lime and lime-soda softening, greensand, manganese fiber, coagulation techniques and activated alumina, were evaluated in terms of cost, efficiency, reliability, process control and feasibility for the removal of uranium, radium and radon from water. Each of the alternative processes has disadvantages making necessary the continued search for a safe, effective method of radioactive metals removal with a minimum of waste product formation.

For instance, manganese dioxide, an effective absorber of many metal ions, was used to remove naturally-occurring radioactive radium from water supplies in Illinois and Iowa. On a laboratory scale, it was found that passing the radium-containing water through a vessel containing a manganese dioxide-impregnated fibrous filter media removes up to 90% of the radioactive radium. Also, this method did not require the backwashing or regeneration of the resin bed that is required in ion exchange methods, thus avoiding the liquid wastewater discharge disposal problem. However, the manganese dioxide-impregnated fiber method does have severe disadvantages including difficult preparation and handling of the impregnated fibers, the need for qualified operators, and poor practical performance since up to 50% of the loosely held manganese dioxide is washed out of the fiber during water treatment. These disadvantages illustrate why, to date, no practical, cost-effective, simple method is available for the removal of naturally-occurring radioisotopes from water supplies.

In Belgian Pat. No. 887,710, radionuclide-containing effluents from nuclear reactors are decontaminated by contacting the effluent with a solid inorganic non-radioactive material, followed by separation of the decontaminated liquid effluent from the solid or solid-liquid fraction containing the radionuclides. The inorganic non-radioactive material is usually a metal oxide, a spinel or a zeolite, and preferably is manganese dioxide. The inorganic nonradioactive material is discarded after contact with the radionuclide-containing effluent. A major disadvantage of this method is the large volume of solid or solid-liquid waste that is generated.

One of the more promising new alternative approaches that possesses the potential of fulfilling to a significant degree the desirable requirements for treating metal-bearing liquids is xanthate technology. A patent to John Hanway Jr. et al., U.S. Pat. No. 4,166,032, discloses the use of cellulose xanthate for heavy metals removal from wastewater streams. While cellulose xanthate is very effective for the removal of heavy metals from wastewater, the cellulose xanthate adds an amount of sludge equal to the dry weight of the cellulose xanthate added to the wastewater stream further increasing both the weight and volume of the sludge generated. Also, cellulose xanthate cannot be used successfully in a continuously flowing process wherein the removal material is held in a flow column and capable of periodic replacement.

In accordance with the present invention, it has been found that one or more water-insoluble carboxylated celluloses, such as an aluminum salt of carboxymethylcellulose, can remove heavy metals, and, in particular, radioactive heavy metal isotopes in new and unexpected proportions from liquids, such as nuclear fuel manufacturing wastewater streams, natural waters, and other wastewaters and nuclear-contaminated oils, leaving a substantially non-polluted solution or effluent capable of plant recycle or legal discharge.

It is known that insoluble forms of cellulose, such as carboxymethylcellulose, are effective in removing certain heavy metals such as Al, Cr, Sn, Pb, Fe, Cu, Ni and Zn from a wastewater, as disclosed in A SYSTEM OF ION-EXCHANGE CELLULOSES FOR THE PRODUCTION OF HIGH PURITY WATER, Horwath Zs, Journal of Chromatography, 102 (1974) pp. 409–412. However, such insoluble celluloses have not been used for removal of the radioactive isotopes of elements such as U, Cs, Sr, Ra, Ru, Hr, Np or Tc from waste streams. Further, such insoluble carboxylated celluloses have not been insolubilized in the presence of other solid heavy metal interactants, such as absorbers, adsorbers, reactants, or cation exchange materials to entrap the other heavy metal interactant within a water-penetrable water-insoluble carboxylated cellulose network, as accomplished in accordance with one embodiment of the present invention. As disclosed in the Horwath article, the insoluble carboxymethylcellulose is disposed in a column in a sandwich-type arrangement with other forms of ion-exchange celluloses and the wastewater passed through the column, with the ion exchange celluloses acting as a filtering media for absorption of the heavy metals therein.

U.S. Pat. No. 4,260,740, assigned to Pfizer, Inc., also discloses that insoluble carboxylated cellulose is useful as an ion exchange material for removal of heavy metals from an industrial effluent and for precious metal recovery. The process disclosed in U.S. Pat. No. 4,260,740 teaches a reaction of cellulose with polycarboxylic acids followed by a hydrolysis step in dilute alkali at a pH of 8 to 11 to bind each polycarboxylic acid moiety to the cellulose and thereby increase the ion exchange capacity towards heavy metal ions.

The removal of heavy metals, especially radioactive isotopes, from a liquid requires that concurrent consideration be given to disposing of the removed heavy metals. It is extremely advantageous to generate a low volume heavy metal-containing solid or sludge that may be safely and economically treated and disposed of. It has been found that the resulting radioactive bed from an insoluble form of carboxymethylcellulose and a heavy metal interactant, such as a transition metal oxide, can be treated easily using existing technology to produce small volume, radioactive ceramic fibers and spheres. The overall radioactive waste is thus reduced in volume by several factors, allowing for easier and less expensive disposal.

U.S. Pat. No. 4,537,818 teaches the manufacture of free-standing metal oxide films by absorbing cations such as U, Zr, Nd, Ce, Th, Pr, and Cr onto carboxymethylcellulose, The heavy metal-impregnated film first is heated in an inert atmosphere and then oxidized to form a metal oxide membrane useful as a nuclear acceleration target material.

In accordance with the present invention, heavy metals, including their radioactive isotopes, are removed from liquids to an unexpectedly high degree by contacting the liquid with an insoluble carboxylated cellulose, such as an insoluble salt of carboxymethylcellulose, and a heavy metal interactant, e.g., absorber, adsorber, reactant and/or ion exchange material, such as a transition metal oxide. The resultant radioactive heavy metal-containing mixture being converted to a non-leaching, ceramic-type mineral, that is suitable for safe disposal.

SUMMARY OF THE INVENTION

In brief, the present invention is directed to a method for treating a heavy metal and/or a radioactive metal-containing natural water or liquid such as a radioactive metal-containing wastewater stream, a potable water supply containing heavy metal and/or radioactive heavy metal contaminants, an oil containing one or more heavy metal and/or radioactive heavy metal ions or other heavy metal and/or nuclear heavy metal-bearing liquids and the disposal of the resultant heavy metal, and particularly radioactive heavy metal-containing waste. Further, in accordance with one embodiment of the present invention, a liquid carboxylated cellulose is solidified in the presence of suspended particles of a material capable of interacting with a heavy metal (hereinafter called a heavy metal interactant such as by absorption, adsorption, reaction or ion-exchange, to entrap the interactant within a water-penetrable matrix of insoluble carboxylated cellulose. To achieve the full advantage of this embodiment of the present invention, the insoluble form of the carboxylated cellulose is formed into spherical beads capable of forming a glass or ceramic-type of ball when subjected to sufficient heating to provide beads or spheres containing the heavy metals within the interior incapable of leaching out when buried under normal subterranean conditions.

The process and carboxylated cellulose-heavy metal interactant material mixture of the present invention have been found to be unexpectedly effective on radioactive natural waters, wastewaters or any other liquid containing one or more radioactive heavy metal ions such as U, Ce, Sr, Ru, Ra, Np or Tc. In accordance with the principles of the present invention, the heavy metal or radioactive heavy metal-containing liquid is contacted with a water-insoluble carboxylated cellulose heavy metal interactant, such as a metal absorbing transition metal oxide mixture to separate the heavy metals and radioactive heavy metals from the liquid as a low volume solid sludge. The resulting heavy metal and/or radioactive heavy metal sludge then is converted into a non-leaching ceramic-type mineral suitable for burial.

Suitable heavy metal interactants include inorganic cation exchange materials such as zirconium phosphate; polyantimonic acid; a mixture of 20% of ammonium phosphotungstate in zirconium phosphate; silicic acid; tin oxide; titanium oxide; pertitanic acid; zirconium oxide; chromium oxide; ferric oxide; manganese oxide; chromium phosphate; zirconium silicophosphate; tin phosphate; lead sulphide; zinc sulfide; titanium phosphate; cobalt-potassium ferrocyanide; copper ferrocyanide; ferric ferrocyanide; and nickel ferrocyanide. Organic cation exchange resins also are suitable as heavy metal interactants, such as a sulfonated styrene divinyl benzene and other crosslinked polyelectrolytes generally having carboxylic ($Coo^{31}$ ) sulfonic ($SO_3^-$) or phosphate ($PO_3H^-$) cation exchange groups. Other suitable interactants include sulfonated coal, e.g., ZEO-KARB, or any water-insoluble polymer having cation exchange groups, e.g., $SO_3^-$, $COO^-$, $PO_3H^-$ or $O^-$.

Accordingly, an object of the present invention is to provide a method, composition and method of manufacturing the composition for teating a liquid containing one or more dissolved heavy metals to cause removal of unexpected amounts of the heavy metals.

Another object of the present invention is to provide a method, composition and method of manufacturing the composition for treating a liquid contaminated with gas or more heavy metals or radioactive heavy metals with a mixture of an insoluble form of a carboxylated cellulose and a heavy metal interactant.

Another object of the present invention is to provide a method, composition and method of manufacturing the composition for treating a liquid containing one or more radioisotopes to cause removal in an unexpectedly large proportion of the radioisotopes therefrom.

Another object of the present invention is to provide a method, composition and method of manufacturing the composition for treating radioisotope-bearing water or other liquids with a water-insoluble form of a carboxylated cellulose and a metal-absorbing transition metal oxide for removal of the radioisotopes therefrom.

Another object of the present invention is to provide a method, composition and method of manufacturing the composition for contacting a liquid containing one or more nuclear isotopes of a heavy metal, with an insoluble form of a carboxymethylcellulose and a metal-absorbing transition-metal oxide to remove a substantial portion of the nuclear isotopes, thereby rendering the treated liquid suitable for public use, disposal or for recycle to an industrial process.

Another object of the present invention is to provide a method of manufacturing water-insoluble carboxylated cellulose containing an insoluble form of a finely divided heavy metal interactant such that upon contact with a heavy metal-contaminated liquid, an unexpected proportion of the heavy metal ions in solution will interact with the insoluble carboxylated cellulose and with the heavy metal interactant for removal of the heavy metal ions without substantial separation or leaching of the heavy metal interactant from the carboxylated cellulose.

Another object of the present invention is to provide a method, composition and method of manufacturing the composition for contacting a liquid containing one or more nuclear isotopes of a heavy metal, with an insoluble aluminum carboxymethylcellulosemanganese dioxide mixture to remove a substantial portion of the nuclear isotopes, thereby rendering the treated liquid suitable for public use, disposal or for recycle to an industrial process.

Another object of the present invention is to provide a method, composition and method of manufacturing the composition for contacting a liquid containing one or more nuclear isotopes of a heavy metal whereby a low volume of radioisotope-laden solid waste is generated.

Another object of the present invention is to provide a method for converting the solid sludge generated by the removal of one or more nuclear isotopes of a heavy metal from a liquid to a substantially non-leaching, ceramic-type mineral suitable for safe and economical disposal.

DETAILED DESCRIPTION OF THE PREFERRED EMBODIMENT

In accordance with the principles of the present invention, residual heavy metal and heavy metal radioisotope contents in the low parts-per-million range (e.g., less than 0.1 ppm, and in fact often parts-per-trillion) may be obtained by contacting the contaminated liquid with a mixture of an insoluble carboxylated cellulose, such as carboxymethylcellulose, and a heavy metal interactant, such as a metal-absorbing transition metal oxide, such as manganese dioxide, by flowing the liquid through a column containing the insoluble carboxylated cellulose and heavy metal interactant, e.g., transition metal oxide mixture.

In accordance with an important feature of the present invention, a carboxylated cellulose, particularly a carboxymethylcellulose, is used in conjunction with a heavy metal interactant, for example, a heavy metal absorbent, adsorbent, reactant, or ion exchange material, such as a metal-absorbing transition metal oxide, to remove heavy metals and/or radioactive heavy metals from wastewater streams, potable water suplies, oils and other heavy metal ion-bearing and nuclear bearing metal-bearing liquids. The aluminum salt of carboxymethylcellulose was used in the initial testing due to the ease of synthesis of the aluminum salt of carboxymethylcellulose. By way of example, an insoluble form of carboxymethylcellulose is obtained by mixing a solution of sodium carboxymethylcellulose with a solution of aluminum sulfate or aluminum nitrate to produce an insoluble aluminum carboxymethylcellulose. Similarly, insoluble forms of carboxylated celluloses, such as carboxymethylcellulose, may be obtained by mixing the soluble form with ions other than aluminum ions, such as chromium ion ($Cr^{+3}$), e.g. in the form of chromium nitrate or chromium chloride, to produce chromium carboxylated celluloses, such as chromium carboxymethylcellulose. Other suitable insoluble carboxylated celluloses, such as ferric carboxymethylcellulose can be synthesized from water soluble ferric ($Fe^{+3}$) salts, and it is expected that most metals in the +3 oxidation state will similarly form water-insoluble, crosslinked carboxylated celluloses, such as carboxymethylcelluloses, capable of interaction with heavy metal and radioactive heavy metal-bearing liquids for removal therefrom.

Metal-crosslinked, water-insoluble carboxymethylcellulose removes heavy metals and radioactive heavy metals from liquids chemically or physically, thereby insolubilizing the heavy metal ions and radioactive metal ions and apparently releasing the metal crosslinker into solution. Therefore, the particular metal chosen to crosslink with the carboxymethylcellulose is determined by the inherent toxicity of the crosslinking metal, the physical characteristics of the resulting crosslinked carboxymethylcellulose, the heavy metal and radioactive heavy metal ions to be removed from the liquid and the desired ceramic storage form, such as aluminates or titanates. For example, iron-crosslinked carboxymethylcellulose effectively removes radioactive heavy metal ions from liquids but may not have the necessary physical characteristics for forming a ceramic material for practical use. Other metals that may be used to crosslink the carboxymethylcellulose include copper, silicon and titanium; with titanium-crosslinked carboxymethylcellulose being particularly useful in removing radioactive cesium and strontium from liquids.

To achieve the full advantage of the present invention, aluminum is used to crosslink the carboxycarboxylated cellulose. Aluminum carboxymethylcellulose is easy to synthesize, has excellent physical characteristics and effectively removes radioactive heavy metals from liquids. As disclosed in a copending application, Ser. No. 849,152, now U.S. Pat. No. 4,764,281, hereby incorporated by reference, aluminum carboxymethylcellulose, when used alone, effectively removed heavy metals and radioactive heavy metals such as U, Ru, Rh, Ce, St, Ra, Np and Tc. It has been found that combining an insoluble form of a carboxylated cellulose, and in particular, an insoluble form of carboxymethylcellulose, with a heavy metal ion and particularly a radioactive heavy metal interactant, such as a metal-absorbing transition metal oxide, unexpectedly improves heavy metal and/or radioactive heavy-mnetal ion removal from liquids and provides a mixture that may be transformed into a non-leaching, ceramic-type material, particularly after ion exchange absorption or adsorption, up to saturation, with heavy metal nuclear isotopes. The resulting material after suitable heating is suitable for safe and economical disposal by burial.

Other suitable heavy metal ion interactants include zirconium phosphate; polyantimonic acid; a mixture of 20% of ammonium phosphotungstate in zirconium phosphate; silicic acid; tin oxide; titanium oxide; pertitanic acid; zirconium oxide; chromium oxide; ferric oxide; manganese oxide; chromium phosphate; zirconium silicophosphate; tin phosphate; lead sulphide; zinc sulfide; titanium phosphate; cobaltpotassium ferrocyanide; copper ferrocyanide; ferric ferrocyanide; nickel ferrocyanide, finely ground organic cation exchange resisn, such as a sulfonated styrene divinyl benzene; and other crosslinked polyelectrolytes generally having carboxylic ($COO^-$), sulfonic ($SO_3^-$) phosphate ($PO_3H^-$) or weak acid ($O^-$) cation exchange groups. Other suitable interactants include sulfonated coal, e.g., ZEO-KARB, or any water-insoluble polymer having cation exchange groups, e.g., $SO_3^-$, $COO^-$, $PO_3H^-$ or $O^{31}$.

In accordance with an important embodiment of the present invention, a heavy metal ion-absorbing or adsorbing transition metal oxide together with a water insoluble carboxylated cellulose effectively removes radioactive heavy metal ions from natural waters, wastewaters, oil and other nuclear radioisotope-containing liquids.

To achieve the full advantage of the present invention, the transition metal oxide is manganese dioxide. Manganese dioxide has been tested for removing radioactive radium from drinking water supplies. When used alone, manganese dioxide removes approximately 55% of the radioactive radium from natural water sources. Radium-removal efficiency is increased to about 90% Ra removal by employing manganese dioxide-impregnated fibers; however, the fibers are difficult to prepare and require qualified operators for efficent use. Also, practical performance of manganese dioxide-impregnated fibers is adversely affected by the washout of up to about 50% of the loosely-held manganese dioxide from the fibers.

Therefore, an important feature of the present invention is to effectively and economically remove radioactive heavy-metal isotopes from liquids using a mixture of an insoluble carboxylated cellulose, and particularly an insoluble carboxymethylcellulose, and a transition metal oxide. As described in Example 1, an aluminum carboxymethylcellulose-manganese dioxide misture effectively avoids the severe manganese dioxide washout problems of manganese dioxide impregnated fibers. The composition of Example 1 yields colloidal manganese dioxide homogeneously interspersed within water-penetrable spheres of aluminum carboxymethylcellulose. As will be more fully described below, homogeneous distribution of the transition metal oxide, particularly manganese dioxide within spherically-shaped beads of an insoluble but liquid-penetrable form of a carboxylated cellulose, particularly aluminum carboxymethylcellulose, provides a spherical nonleaching, ceramic-type radioactive metal-laden matrix, e.g., a spinel, having the radioactive metals internally encapsulated within the beads, such as by calcination, without manganese dioxide washout.

EXAMPLE 1

Forty-two grams of commercial sodium carboxymethylcellulose, previously dampened with a small amount of water, was slowly added to 500 ml. of water, and the mixture was stirred for 24 hours. After the sodium carboxymethylcellulose was completely dispersed in the water, 100 ml. of an aqueous 1% potassium permanganate solution was added to the sodium carboxymethylcellulose dispersion, and the mixture was thoroughly blended. Sixty milliliters of 3% hydrogen perioxide then was added slowly to the permanganatecarboxymethylcellulose mixture to convert the permanganate to colloidally suspended manganese dioxide. The mixture was stirred for 10 minutes, or until the reaction was complete as evidenced by no further formation of oxygen bubbles. The resulting sodium carboxymethylcellulose-manganese dioxide mixture then was added dropwise to an aqueous solution of 50 gm. of aluminum sulfate dissolved in one liter of water. A precipitate formed immediately, consising of spherical beads of aluminum carboxymethylcellulose and colloidal manganese dioxide and was subsequently filtered from the supernatant liquid.

In accordance with an important feature of the present invention, nuclear or radioactive metals are removed from solution using the insoluble aluminum carboxymethylcellulose-manganese dioxide composition of Example 1 by flowing the contaminated liquid solution through a bed of the insoluble carboxylated cellulose-transition metal oxide mixture. The insoluble carboxylated cellulose-transition metal oxide mixture is capabale of removing unexpected quantities of nuclear or radioactive metals from liquids including metals such as radium, radon, molybdenum, praseodymium, polonium, lead, astatine, bismuth, thallium, mercury, zirconium, barium, promethium, uranium, cesium, strontium, ruthenium, neptunium, technetium, iodine, thorium, niobium, cerium, rubidium, palladium, curium, plutonium, tellurium, samarium, americium, protactinium, lanthanium, indium, neodymium, lutetium or mixtures thereof and is particularly effective for removal of U, Ce, Sr, Ru, Ra, Np, Tc and other radioactive ions.

In some cases a pre-treatment of the contaminated liquid is desirable to assist in removing non-radioactive ions, molecules or complexes from the solution. For example, pre-treatment with hypochlorite, chlorine gas, ozone or other oxidizing agent is used for the destruction of ions such as cyanide. Additionally, other reagents may be used with the water-insoluble carboxylated cellulose to aid directly or indirectly in radioactive metal removal. It has been found that sodium diethyldithiocarbamate can be used to facilitate removel of pH-sensitive metals such an Ni and Co. Treatment of a radioactive metal-bearing liquid may also involve the adjustment of the pH of the solution to facilitate the reaction or to comply with municipal sewer requirements.

Initial evaluation of the water-insoluble carboxylated cellulose-manganese dioxide mixture for possible use in removing radioactive metals from nuclear waste streams initially centered on a slurry treatment technique. However, ti was realized that a vertical column loaded with spheres or other shaped particles of the water-insoluble aluminum carboxymethylcellulose-manganese dioxide mixture produced more efficient radioactive metals removal by attaining maximum flow and maximum liquid to solid surface contact, thus tests were conducted using this technique. A disposable, plastic cartridge, preloaded with an insoluble carboxylated cellulose-manganese dioxide mixture could easily retrofit into existing equipment of the user, and is ideally suited for the above-mentioned conversion, after loading to capacity with a radioactive metal, by calcination to a non-leaching, ceramic-type material that is suitable for burial.

In evaluating any process for the removal of radioactive isotopes of heavy metals from liquids, concurrent consideration must be given to the disposal of the resulting radioactive waste. Any facility operating to remove radioactive isotopes from liquids is a generator of low-level radioactive wastes, and therefore subject to the stringent waste regulations promulgated by the Environmental Protection Agency, Nuclear Regulatory Commission, Department of Energy and individual states. Most facilities, to avoid the enormous cost and poor public image of being a licensed disposal facility, ship any generated radioactive waste to an existing approved site for suitable disposal. However, the generating facility must still comply with the appropriate Department of Transportation shipping regulations for shipping radioactive waste.

In addition to regulations directed to the radioactivity of the waste, the possibility exists that the material may also meet the definition of a "Hazardous Waste" as defined by the Resources Conservation and Recovery Act (RCRA). For example, if any type of ion-exchange or zeolite water softening process is employed to remove radioactive radium, the process also will remove barium from the water. Since barium, along with arsenic, cadmium, lead, selenium, chromium, mercury and silver, is listed among the eight toxic elements prohibited from burial by RCRA, certain leach tests must be passed or RCRA specifically prohibits liquid deep well disposal or shallow burial of this toxic waste material.

Of the known methods to remove radioactive isotopes from liquids, only the process of the present invention will economically generate a solid waste form. Processes for removing heavy metal radioactive isotopes by water softening techniques, organic ion-exchange, or reverse osmosis, all produce large volumes of liquid radioactive wastes during regeneration of the solid substrate. In accordance with an important feature of the present invention, the heavy metal radioactive-isotope removal process of this invention offers the notable advantage of generating only a solid waste of greatly reduced volume. The generation of a low-volume solid waste is particularly advantageous since, at present, there is no approved method for the direct disposal of liquid radioactive wastes.

Any other process for the removal of radioactive isotopes from liquids will produce a radioactive liquid waste. The resulting radioactive liquid waste must be shipped to and treated at an approved, licensed faciltiy. Any method for the removal of radioactive isotopes that generates a liquid waste is certain to greatly increase the cost of disposal due to liquid transportation charges and processing charges. The process of the present invention offers several options for solid disposal, with excellent radioactive-sludge volume reductions. While the ultimate form for disposing of the radioactive isotope-laden insoluble carboxylated cellulose-heavy metal interactant, e.g., carboxymethylcellulose-transition metal oxide mixture must be determined by the appropriate applicable regulations, it is envisioned that the spent radioactive isotope-laden carboxylated cellulose-heavy metal interactant mixture may be air-dried, containerized and shipped for direct burial. Air drying at ambient temperatures will effect a five-fold volume reduction of the wet radioactive heavy metal-containing material thereby allowing easier and more economical disposal.

If disposal regulations require burial of only leach-resistant chemical forms, the radioactive-isotope laden carboxylated cellulose-heavy metal interactant may be calcined or heated sufficiently to produce a ceramic-type nonleaching mineral, known as a spinel. The formed chemical spinel, after sufficient heating, much as $MnAl_2O_4$ for the aluminum form of the carboxylated cellulose with manganese dioxide, however also can be other mixed oxides of di- and trivalent metals, of the general formula:

$$M''M_2'''O_4,$$

wherein M'' is a divalent metal such as divalent magnesium, zinc, titanium, manganese, cadmium, cobalt, nickel or ferrous iron; and M''' is a trivalent metal such as aluminum, chromium, ferric iron, manganic manganese, cobaltic cobalt or gallium. Metallic oxides of the spinel form possess a high hardness and extreme water insolubility making spinels an ideal mineral form for waste burial of heavy metal and particularly radioactive heavy metal materials.

In accordance with one important embodiment of the present invention, the insoluble form of carboxylated cellulose, such as aluminum carboxymethylcellulose is prepared in a spherical form and contains a heavy metal interactant especially in a colloidal form, such as a particle size of 0.1 to 100 microns particularly 0.1 to 10 microns, such as colloidal manganese dioxide homogeneously interspersed throughout the aluminum carboxymethylcellulose sphere. Calcination of the carboxylated cellulose-heavy metal interactant mixture at temperatures of about 300° C. to 600° C. yields a non-leaching spinel-type mineral of the general structure $M'' M''' O_4$, described earlier. The radioactive metal radium is also bivalent, and like magnelium, is expected to form a ceramic-type spinel. The calcination of a radioactive metal-laden bed of aluminum carboxymethylcellulose-manganese dioxide is accomplished at temperatures of about 300° C. to about 600° C., and preferably from about 400° C. to about 500° C. The resulting spinel-type ceramic is insoluble in all aqueous solutions except concentrated acids, is generally spherical in shape and is suitable for burial alone or for mixing with any of a plurality of leach-resistant matrices such as hydraulic cement, asphalt or polyester resins.

In accordance with an important feature of the present invention, calcination of the radioactive metal-laden carboxylated cellulose-heavy metal interactant, such as aluminum carboxymethylcellulose-manganese dioxide mixture results in a twenty-fold volume decrease over the initial wet form of the aluminum carboxymethylcellulose-manganese dioxide mixture. Overall, the volume reduction and conversion to a spinel-type ceramic accomplished by calcination provides an economical and safe method for disposal of radioactive wastes. Contact of the liquid to be treated with the insoluble carboxylated cellulose-heavy metal ion interactant mixture creates an insoluble, radioisotope-laden carboxylated cellulose material that can be disposed of as a small volume of material by calcination of 300° to 600° C. to fuse the material into small microscopic ceramic spheres rather than the usual fine powder, that thereafter can be buried in an approved EPA landfill.

In an alternative embodiment of the present invention, radioactive isotopes of heavy metals are removed from natural waters, wastewaters and other liquids by sequentially contacting the contaminated liquid with aluminum carboxymethylcellulose and a heavy metal interacent, e.g., absorbent, adsorbent, ion-exchange material or reactant, such as a transition metal oxide. In a preferred embodiment, prior to or after sequentially contacting the liquid with an insoluble carboxylated cellulose, such as aluminum carboxymethylcellulose and a heavy metal interactant, such as manganese dioxide, the liquid is contacted with a sufficient amount of a water-soluble trithiocarbonate to further precipitate additional heavy metals present in the liquid. In a most preferred embodiment, the liquid contacts the water-soluble trithiocarbonate after sequentially contacting the insoluble carboxylated cellulose and the meavy metal interactant. The insoluble carboxylated cellulose and heavy metal interactant can be separate treatments, or as a mixture, such as described heretofore. The method of removing heavy metal contaminants from liquids with a water-soluble trithiocarbonate is disclosed in U.S. patent application Ser. Nos. 747,008 filed June 20, 1985 and 843,109 filed March 24, 1986, hereby incorporated by reference.

If the radioactive isotope-containing liquid is treated sequentially, it is immaterial if the heavy metla oxide, e.g., transition metal oxide, or the insoluble carboxylated cellulose constitutes the first metals-removal step, however, in a preferred embodiment the liquid is first treated with a heavy metal interactant, such as manganese dioxide. After saturation with metal ions, the radioactive-metal laden heavy metal interactant, e.g., manganese dioxide, and the insoluble carboxylated cellulose, e.g., aluminum carboxymethylcellulose, are combined prior to calcination in order to produce the non-leaching, ceramic-type spinel. To achieve the fullest advantage of this embodiment, the water-soluble trithiocarbonate treatment is the final step of the metals removal process, and the precipitate formed from the trithiocarbonate treatment may be combined with the radioactive isotope-laden carboxylated cellulose and heavy metal interactant prior to calcination (heating to form a spinel-type material). The inclusion of the trithiocarbonate step at the end of the metals-removal process further serves to remove aluminum and manganese ions from the liquid that are introduced into the liquid via the ion exchange reaction occurring between the aluminum carboxymethylcellulose, manganese dioxide and the radioactive heavy-metal isotopes present in the water or wastewater.

In accordance with the present invention, tests were run on radioactive isotope-containing waters. These tests, performed according to the method of the present invention, showed new and unexpected radioactive-isotope and other heavy metal ions removal from the contaminated water.

EXAMPLE 2

Aluminum carboxymethylcellulose was mixed with manganese dioxide according to the procedure of Example 1. The mixture was placed in a column, and was used to remove radioactive radium and its decay daughters according to the following procedure:

Colum diameter—1 in.
Bed volume—60 cc
Flow rate—30 cc/min. (avg.)
Total feed—600 cc (10 bed volumes)
pH—7.3

Feed activity (gross alpha-Radium and daughters in equilibrium).

$6.723\times10^4$ disintegrations per second per liter (Becquerels per liter)

Test samples from 3–200 cc successive collections of effluent:

1st 200 cc through O-d/s/1

2nd 200 cc through $1.90\times10^2$ d/s/1=0.28%

3rd 200 cc through O d/s/1

The count in the second sample represents 3.8 counts per minute, per cc, above background count rate of the instrument (3 per minute)—for minimal accuracy, the sample count rate should be at least 50 times the background, thus the reading in this test is insignificant.

EXAMPLE 3

A 1.5 liter sample from a feed pond was treated with the manganese dioxide-aluminum carboxymethylcellulose mixture of Example 1 and sodium trithiocarbonate, respectively, according to the following procedure. The initial water sample, before treatment, was analyzed by Inductively Coupled Plasma Atomic Absorption (I.C.P.) and found to contain the following metals:

Radium = 160 ± 10 picocuries/liter
Uranium - 0.22 mg/L
Metals Analysis by I.C.P. (in ppm)

| | |
|---|---|
| B | 4.0 |
| Cd | 0.10 |
| Mo | 5.4 |
| Pb | 4.2 |
| Zn | 4.2 |
| Ag | 1.1 |
| Ba | 0.42 |
| Co | 0.21 |
| Ga | 6.3 |
| Mg | 2.0 |
| Sb | 4.2 |
| Sn | 1.1 |
| Zr | 0.42 |
| Be | 0.04 |
| Cr | 0.84 |
| Hf | 0.84 |
| Sr | 2.0 |
| Li | 4.2 |
| Al | 4.2 |
| Ca | 5800 |
| Cu | 0.42 |
| Mn | 0.1 |
| Ni | 1.3 |
| Se | 4.2 |
| Ti | 0.42 |
| As | 2.1 |
| Fe | 0.63 |
| P | 6.3 |
| Si | 10.0 |
| V | 0.21 |

After adjusting the pH to 7.0, the water sample was directed through a 180 cc bed of manganese dioxidealuminum carboxymethylcellulose mixture at a flow rate of 50 cc/min. After this initial treatment, a sample was withdrawn and analyzed, and found to contain less than 0.1 picocuries/liter of radium and less than 0.01 mg/liter of uranium. No metals analysis was performed.

After passing through the manganese dioxidealuminum carboxymethylcellulose bed, the pH of the water sample was adjusted to 4.0, and, at a flow rate of 50 cc/min. was passed through a 180 cc bed of aluminum carboxymethylcellulose. Immediately after this second treatment another sample was withdrawn and analyzed, and found to contain the following metals:

Radium = 0.2 ± 0.4 picocuries/liter
Uranium 0.01 mg/L
Metals Analysis by I.C.P. (in ppm)

| | |
|---|---|
| B | 2.4 |
| Cd | 0.01 |
| Mo | 0.08 |
| Pb | 0.4 |
| Zn | 0.16 |
| Ag | 0.1 |
| Co | 0.02 |
| Ba | 0.33 |
| Ga | 0.6 |
| Mg | 2.2 |
| Sb | 0.4 |
| Sn | 0.1 |
| Zr | 0.04 |
| As | 0.2 |
| Be | 0.004 |
| Cr | 0.08 |
| Hf | 0.08 |
| Sr | 0.28 |
| Li | 1.2 |
| Al | 83 |
| Ca | 2000 |
| Cu | 0.14 |
| Mn | 2.0 |
| Ni | 0.12 |
| Se | 0.4 |
| Ti | 0.04 |
| Fe | 0.06 |
| P | 0.6 |
| Si | 1.2 |
| V | 0.02 |

It is noted that the Mn and Al concentrations have increased over the feed sample due to slight washout of manganese dioxide in the initial treatment and incomplete washing and/or cation exchange of the contaminating-metal for the aluminum of the aluminum carboxymethylcellulose.

The water sample is then pH-adjusted back to 7.0 and treated with 2 cc. of 5% aqueous sodium trithiocarbonate per liter of sample. The resulting precipitate is filtered off, and a sample of the filtrate was withdrawn and analyzed. After the final purification step, the water sample was found to contain the following metals:

Radium = 1.3 ± 1.0 picocuries/liter
Uranium = 0.01 mg/L
Metals Analysis by I.C.P. (in ppm)

| | |
|---|---|
| Mo | 0.08 |
| Al | 2.7 |
| Cu | 0.04 |
| Mn | 1.6 |

No significant changes were found in the concentrations of any of the other metals.

The final sodium trithiocarbonate treatment removed the previously washed-out manganese and eluted aluminum to provide a radioactive- and metal-free water suitable for discharge to the environment or for plant recycles. When the heavy metal interactant-insoluble carboxylated cellulose and aluminum carboxymethylcellulose beds are spent or saturated with radioactive and heavy metals, they may be combined, then, together with the precipitate from the sodium trithiocarbonate treatment, air-dried, and finally calcined to yield a non-leaching ceramic-type spinel that is approximately one-twentieth the volume of the combined, wet manganese dioxide and aluminum carboxymethylcellulose beds and is suitable for appropriate disposal.

It should be understood that the present disclosure has been made only by way of preferred embodiment and that numerous changes in details of construction, combination and arrangement of parts may be resorted to without departing from the spirit and scope of the invention as hereinunder claimed.

What is claimed and desired to be secured by Letters Patent of the United States is:

1. A method of manufacturing a heavy metal-removing mixture of a water-penetrable, insoluble carboxylated cellulose and a plurality of insoluble particles of a heavy metal interactant comprising:

dispersing solid particles of a heavy metal interactant in a carrier liquid;

cross-linking a water-soluble form of a carboxylated cellulose to insolubilize the carboxylated cellulose while in close proximity to said heavy metal interactant particles and entrap some of the heavy metal interactant particles within the insolubilized carboxylated cellulose to form said heavy metal-removing mixture.

2. The method of claim 1 wherein the heavy metal interactant is an absorbent, adsorbent, reactant or an ion exchange material for heavy metals.

3. The method of claim 2 wherein the heavy metal interactant is a transition metal oxide.

4. The method of claim 3 wherein the heavy metal oxide is manganese dioxide.

5. The method of claim 1 wherein the insoluble carboxylated cellulose is a salt of carboxymethylcellulose.

6. The method of claim 5 wherein the carboxymethylcellulose salt is the aluminum, chromium, titanium, copper, silicon or iron salt of carboxymethylcellulose.

7. The method of claim 6 wherein the insoluble carboxymethylcellulose is aluminum carboxymethylcellulose or titanium carboxymethylcellulose.

8. The method of claim 1 wherein the heavy metal interactant comprises solid particles having a particle size of 0.1 to 100 microns.

9. The method of claim 8 wherein the heavy metal interactant comprises solid particles having a particle size of 0.1 to 50 microns.

10. The method of claim 9 wherein the heavy metal interactant comprises solid particles having a particle size of 0.1 to 10 microns.

11. The method of claim 1 wherein the metal-removing mixture is in the form of water-penetrable spherical beads.

12. The method of claim 11 wherein the spherical beads include a colloidal heavy metal interactant homogenously interspersed within the insoluble carboxylated cellulose.

13. The method of claim 1 wherein the soluble form of a carboxylated cellulose is a salt of carboxymethylcellulose.

14. The method of claim 13 wherein the salt of carboxymethylcellulose is sodium carboxymethylcellulose.

15. The method of claim 1 wherein the soluble form of a carboxylated cellulose is insolubilized by reaction with a multivalent metal cation.

16. The method of claim 15 wherein the multivalent metal cation is aluminum, chromium, titanium, copper, silicon, or iron.

17. The method of claim 16 wherein the multivalent metal cation is aluminum or titanium.

18. The method of claim 1 including forming the particles of heavy metal interactant by dissolving a soluble form of the heavy metal interactant in the carrier liquid, and thereafter reacting the soluble form of the heavy metal interactant with a sufficient quantity of a suitable reactant to insolubilize the heavy metal interactant.

19. The method of claim 18 wherein the soluble form of the heavy metal interactant is an inorganic salt or a soluble polymer.

20. The method of claim 19 wherein the inorganic salt is potassium permanganate.

21. The method of claim 18 wherein the reactant is an oxidizing agent, reducing agent or multifunctional crosslinking agent.

22. The method of claim 21 wherein the reactant is hydrogen peroxide.

23. The carboxylated cellulose-heavy metal interactant mixture manufactured by the process of claim 2.

24. The product made by the process of claim 6.

25. An insoluble cross-linking carboxylated cellulose having uniformly distributed throughout its interior a plurality of finely divided water-insoluble particles of a heavy metal interactant.

* * * * *